(12) United States Patent
Matsuhashi et al.

(10) Patent No.: US 6,183,003 B1
(45) Date of Patent: Feb. 6, 2001

(54) AIR BAG MOUNTING AND VENT HOLE ARRANGEMENT

(75) Inventors: Toshiaki Matsuhashi, Gamagouri; Tomoji Suzuki, Nagoya; Yoshihiro Kaneko; Hajime Nakagawa, both of Kariya, all of (JP)

(73) Assignee: Nippondenso Co., Ltd., Kariya (JP)

( * ) Notice: Under 35 U.S.C. 154(b), the term of this patent shall be extended for 0 days.

(21) Appl. No.: 08/404,862

(22) Filed: Mar. 15, 1995

(30) Foreign Application Priority Data

Mar. 22, 1994  (JP) .................................................. 6-050299

(51) Int. Cl.$^7$ ............................. B60R 21/28; B60R 21/26
(52) U.S. Cl. ................... 280/728.2; 280/739; 280/743.1
(58) Field of Search .................... 280/728.2, 739, 280/743.1, 742, 738, 731, 736, 741, 728.1

(56) References Cited

U.S. PATENT DOCUMENTS

| | | | |
|---|---|---|---|
| 3,573,885 | * | 4/1971 | Brawn et al. ........................ 280/739 |
| 3,820,814 | * | 6/1974 | Allgaier et al. ....................... 280/742 |
| 3,827,715 | * | 8/1974 | Lynch .................................. 280/731 |
| 4,111,458 | * | 9/1978 | Okada et al. ......................... 280/739 |
| 4,828,286 | * | 5/1989 | Fohl .................................. 280/728.2 |
| 5,016,913 | * | 5/1991 | Nakajima et al. .................... 280/739 |
| 5,141,247 | * | 8/1992 | Barth ................................. 280/728.2 |
| 5,201,542 | * | 4/1993 | Thuen et al. ......................... 280/736 |
| 5,277,442 | * | 1/1994 | Cuevas ............................... 280/728.2 |
| 5,320,379 | * | 6/1994 | Burnard et al. ..................... 280/728.2 |
| 5,445,406 | * | 8/1995 | Jones ................................... 280/741 |

FOREIGN PATENT DOCUMENTS

| | | | |
|---|---|---|---|
| 484527 | * | 5/1992 | (EP) ................................. 280/728.2 |
| 2268124 | * | 1/1994 | (GB) ................................ 280/728.2 |
| 62-141566 | | 9/1987 | (JP) . |
| 3-16553 | | 2/1991 | (JP) . |
| 3292236 | | 12/1991 | (JP) ................................. 280/743.1 |
| 4-339047 | * | 11/1992 | (JP) ................................. 280/728.1 |
| 5-270348 | * | 10/1993 | (JP) ..................................... 280/736 |
| 6286569 | * | 10/1994 | (JP) ..................................... 280/739 |

* cited by examiner

Primary Examiner—Anne Marie Boehler
Assistant Examiner—Peter C. English
(74) Attorney, Agent, or Firm—Cushman, Darby & Cushamn

(57) ABSTRACT

An airbag of an airbag device has a primary hole for receiving an inflator and a secondary hole for receiving a securing device which secures the inflator to a base plate. A section surrounding the secondary hole is sandwiched between the inflator put in the airbag and the base plate. Therefore, the section of the airbag sandwiched between the inflator and the base plate can be enlarged and thus a high securing strength of the airbag can be acquired. The primary hole can comprise a vent hole that is used to discharge the gas from the inflator to the outside of the airbag. This structure need not make the vent hole separately. Therefore, the airbag is made simple and the production cost thereof becomes lower.

10 Claims, 7 Drawing Sheets

AIR BAG MOUNTING AND VENT HOLE ARRANGEMENT

CROSS REFERENCE TO RELATED APPLICATION

This application is based upon and claims priority of Japanese Patent Application No. 6-50299 filed Mar. 22, 1994, the content of which is incorporated herein by reference.

BACKGROUND OF THE INVENTION

1. Field of the Invention:

The present invention relates to an airbag device for protecting a vehicular occupant by softening a shock of a vehicle collision with an airbag inflated when the vehicle collision takes place.

2. Related Art:

An airbag device is already known as a vehicular occupant protective device to protect a vehicular occupant in case of a vehicle collision. The airbag device comprises a sensor for detecting the vehicle collision, an inflator for erupting gas based on a signal from the sensor, an airbag that inflates with the gas erupted from the inflator, a base plate to which the airbag and the inflator are fixed, etc. At the airbag, a hole portion and a vent hole are formed. The hole portion is used to insert a gas erupting portion of the inflator into the airbag, and the vent hole is used to adjust the pressure caused by gas in the airbag.

FIG. 14 shows an example of an airbag device having such a structure. As shown in FIG. 14, a retaining section of an airbag 2 is sandwiched between a retainer 13 and a base plate 10 and secured by bolts 15 or rivets. A diameter of a hole portion 11 for inserting a gas erupting portion of an inflator 9 into the airbag 2 is designed as large as or larger than a diameter of the gas erupting portion of the inflator 9. Thus the gas erupting portion of the inflator 9 can be inserted into the airbag 2 through the hole portion 11, and the gas from the inflator 9 can be erupted into the airbag 2.

However, in the airbag device shown in FIG. 14, the retaining section of the airbag 2 sandwiched between the retainer 13 and the base plate 10 is extremely small. In case of a vehicle collision, high pressure gas from the inflator 9 to inflate the air bag 2 acts instantaneously inside the airbag 2, and a stress caused by the high pressure gas concentrates on the retaining section which is secured to the base plate 10 with the bolts 15. Therefore, if the airbag 2 is damaged by the stress, there arises a possibility that the retaining section of the airbag 2 slips off the base plate 10.

As another example of prior arts, there is an airbag device disclosed in Japanese Unexamined Patent Publication No. 3-292236. An airbag in the airbag device has at least one slit for inserting an inflator thereinto. The airbag is sandwiched between the inflator and a base plate and secured with bolts.

In the airbag device with the airbag having one slit, there arises a possibility that strength of the airbag decline. That is, if the high pressure gas acts instantaneously inside the airbag, the slit may tear from ends thereof. This causes undesired discharge of the high pressure gas to the outside.

SUMMARY OF THE INVENTION

It is an object of the present invention to provide an airbag device which protects a vehicular occupant certainly by improving strength for securing an airbag.

The object is attained by forming a primary hole for enabling insertion of an inflator into an airbag and a secondary hole penetrated by a securing device which secures the inflator to a base plate, and sandwiching a section surrounding the secondary hole between the inserted inflator and the base plate. Thus the section of the airbag sandwiched between the inflator and the base plate can be enlarged, so that the high securing strength of the airbag can be acquired.

The primary hole can comprise a vent hole that is used to discharge the gas erupted by the inflator to the outside of the airbag. This structure need not make a vent hole separately, so that the airbag is made simple and a production cost thereof is lower.

It is desirable to form an cover cloth covering the primary hole of the airbag. The cover cloth which covers the whole primary hole prevents the gas from discharging to the outside of the airbag. In this case the vent hole must be formed independently. Therefore, it is preferable that the cover cloth partly covers the primary hole. Due to such a cover cloth, the primary hole can discharge a suitable amount of the gas to the outside of the airbag in order to adjust pressure in the interior of the airbag. A portion of cover cloth can be formed narrow in order to break the cover cloth in the case where an abnormal rise of the pressure in the interior of the airbag happens.

It can also sew a patch for strengthening the airbag on the periphery of at least one of the primary hole and the secondary hole. This patch and the cover cloth can be composed of a single piece of cloth which is sewed to the airbag so that producing the airbag become easy.

It is preferred to form the secondary hole in the shape of a circle. Thus a stress caused by a high pressure gas from the inflator acts on a periphery of the secondary hole uniformly and the airbag can avoid being damaged.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

The present invention will be described in detail with reference to the embodiments.

Figure 1:
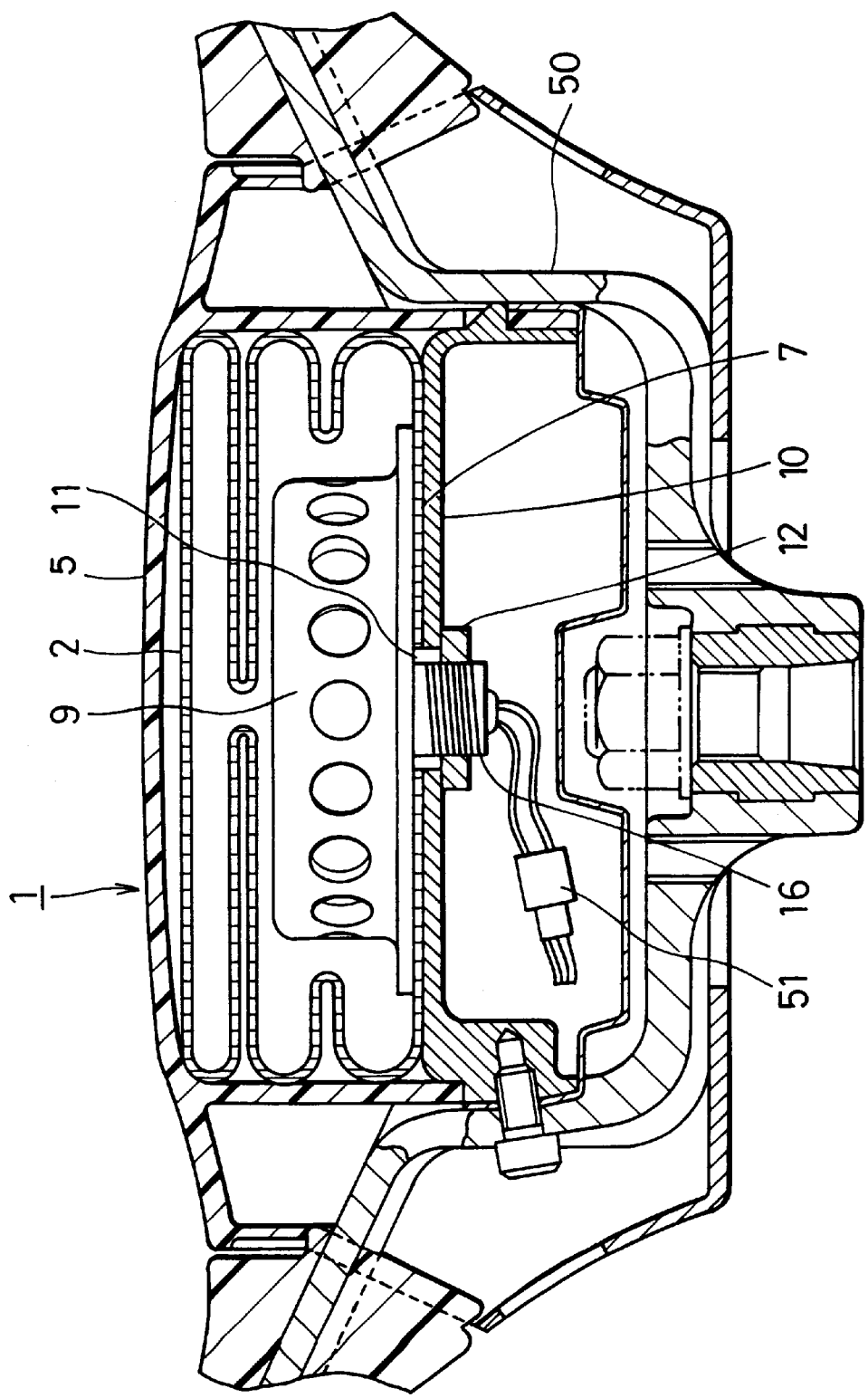
FIG. 1 is a sectional view illustrating the structure of the first embodiment according to the present invention.

FIG. 1 is a sectional view illustrating the entire structure of the airbag device in the first embodiment. In an airbag device 1, a retaining section 7 of an airbag 2 is sandwiched between an inflator 9 inserted into the airbag 2 and a base plate 10. The inflator 9 is secured to the base plate 10 by connecting a screw section 16 thereof with a nut 12. The airbag 2 is folded and housed in a pad 5. The inflator 9 is connected to a power source (not illustrated in the figure) by means of an electrical connector 51 to receive supply of a starting current. When the starting current is supplied to the inflator 9 through the connecter 51, the inflator 9 generates inflation gas for the airbag 2. An electronic control circuit (not illustrated in the figure) controls whether to supply the starting current to the inflator 9, based on a signal detected by an acceleration sensor (not illustrated in the figure). The acceleration sensor is included in the electronic control circuit and outputs the signal when a vehicle has crashed. The acceleration sensor need not be located in the electronic control circuit. It can also be installed outside the electronic control circuit in the vehicle. Furthermore, it is possible to eliminate the electronic control circuit and adopt a mechanical acceleration sensor which is disposed between the power source and the inflator 9. When the acceleration caused by the vehicle collision is applied to the mechanical acceleration sensor, a contact of the mechanical acceleration sensor is closed and the inflator 9 is connected to the power source. It is also possible to install the electronic control circuit or the electronic control circuit including the acceleration sensor within the base plate 10. The airbag device 1 having such a structure is installed in the center of steering wheel 50.

Figure 2:
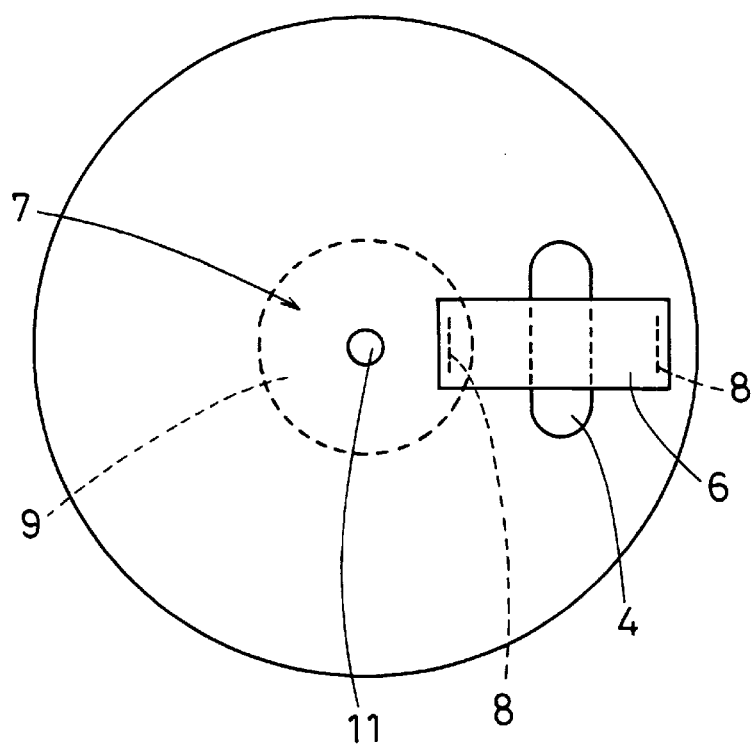
FIG. 2 is a top plan view of the airbag of the first embodiment according to the present invention, seen from the installation side of inflator.
Figure 3:
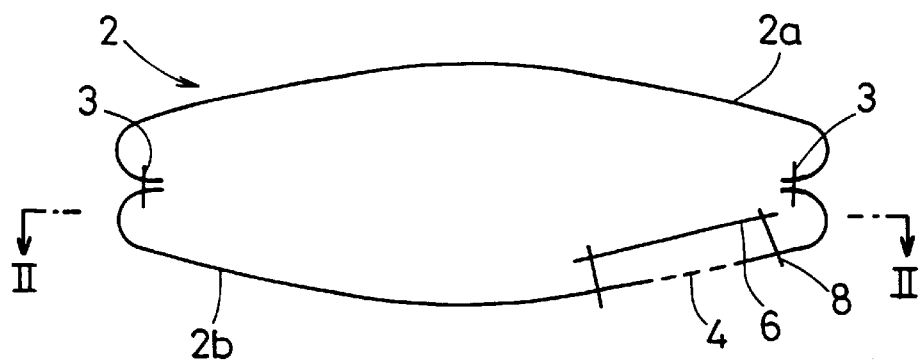
FIG. 3 is a sectional view of the inflated airbag of the first embodiment according to the present invention.

FIG. 2 and FIG. 3 show a detail of the airbag 2. FIG. 2 is a top plan view of the airbag 2 taken on line II—II of FIG.3, which is seen from the attachment side of the inflator 9. FIG. 3 is a sectional view of the airbag 2 in an inflated state.

The airbag 2 is formed in the shape of a balloon by sewing a front cloth 2a to a rear cloth 2b by means of a thread 3, the front cloth 2a and the rear cloth 2b are made of synthetic fiber such as nylon or polyester. The rear cloth 2b has a vent hole 4 as the primary hole. The vent hole 4 is used to adjust the internal pressure of the airbag 2 in order to absorb the shock when the vehicular occupant collides with the airbag 2.

The inflator 9 is inserted into the airbag 2 through the vent hole 4. Then, as described above, the screw section 16 and the connector 51 formed in the inflator 9 go through a hole section 11 as the secondary hole. The inflator 9 and the airbag 2 are secured to the base plate 10 by connecting the screw section 16 and nut 12. The hole section 11 is formed in the size that allows the screw section 16 and the connector 51 to pass therethrough. The hole section 11 is also formed into a round shape to maintain the airbag strength.

The size of the vent hole 4 is large enough to insert the inflator 9 into the airbag 2. However, because the vent hole 4 is used as a passage to insert the inflator 9 into the airbag 2 and at the same time it is necessary to prevent the inflation gas from discharging too much from the vent hole 4, an cover cloth 6 is sewed on the airbag 2 with threads 8 so that it partially blocks the vent hole 4. In FIG. 2, the cover cloth 6 is sewed on an inner surface of the airbag 2, it is also possible to sew it on an outer surface of the airbag 2.

The operation of the first embodiment explained above will be explained.

In FIG. 1, the starting current from the power source is supplied to the inflator 9 through the connector 51, responding to the acceleration signal output from the acceleration sensor when the vehicle has crashed. As a result, the inflator 9 generates the inflation gas inside the airbag 2, and the internal pressure of the airbag 2 rises due to the inflation gas. As the internal pressure rises, the airbag presses on and breaks through the pad 6. Following this, the airbag 2 unfolds to be in a shape of a balloon and prevents the vehicular occupant from colliding with the steering unit 50. At this time, it is possible to absorb the collision energy of the vehicular occupant: by releasing appropriately the internal gas of the airbag 2 receiving the vehicular occupant. The sizes of the vent hole 4 and the cover cloth 6 must be set appropriately because the absorption of the collision energy is determined by the relationship between the sizes of the vent hole 4 and the cover cloth 6.

The effects of the first embodiment will be explained. The stress of the high pressure gas during an inflation of the airbag 2 and a compression stress applied to the airbag 2 when the vehicular occupant collides with airbag 2 are concentrated on the retaining section 7 sandwiched between the inflator 9 and the base plate 10 or the hole section 11 which is formed into the round shape. However, the hole section 11 is formed in an extremely small size. This can make the area of the retaining section 7 larger. As a result, even if the stress described above is applied to the retaining section 7, there will be no slipping of the airbag 2. Thus it need not secure the airbag 2 by tightening the screw section 16 strongly.

Furthermore, because bolts or rivets are not used to secure the airbag 2 to the base plate 10, the stress described above is distributed uniformly over the retaining section 7 and there are no portions where the stress of the inflation gas concentrates. Therefore, it is possible to prevent the airbag 2 from being damaged by the stress.

In addition, because the hole section 11 is in the form of a circle, the above-mentioned stress is distributed uniformly around the hole section 11. As a result, there is very little chance that the airbag 2 tears at the hole section 11.

For reasons mentioned above, the airbag 2 has enough strength against the stress and it is not necessary to apply a reinforcement cloth around the hole section 11 and the vent hole 4. Thus, it is possible to reduce the weight of the airbag 2 and also reduce the volume of the folded state.

For these reasons, the airbag device 1 which includes the airbag 2 can definitely protect the vehicular occupant in case of a vehicle collision and can be made into a small size and light in weight.

Figure 4:
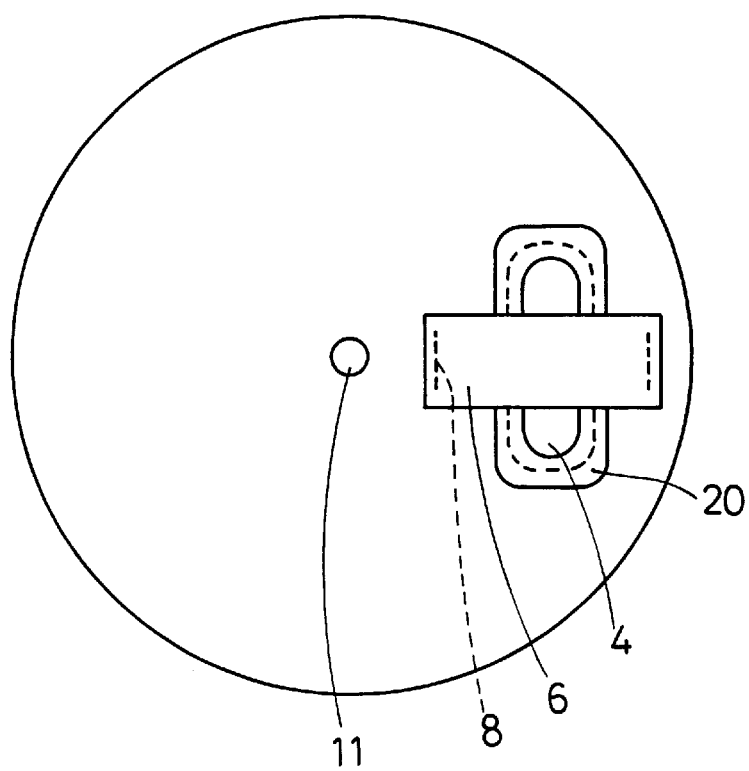
FIG. 4 is a top plan view of the airbag of the second embodiment according to the present invention, seen from the installation side of inflator.
Figure 5:
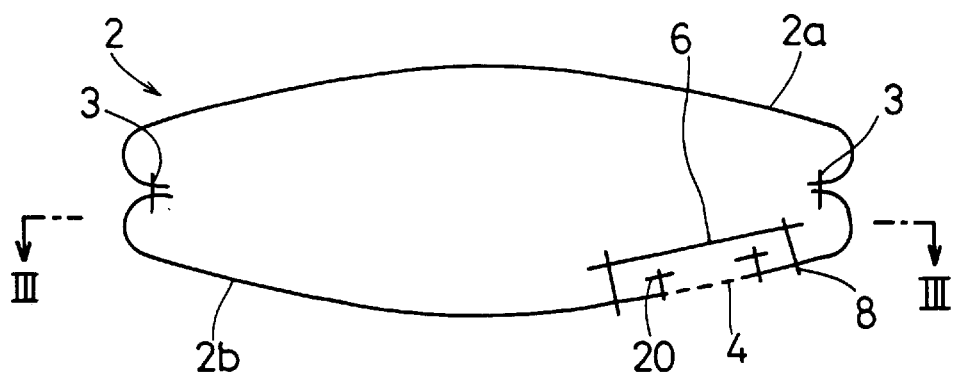
FIG. 5 is a sectional view of an inflated airbag of the second embodiment according to the present invention.

With reference to FIG. 4 and FIG. 5, the second embodiment will be explained. In the explanation hereinafter, only differences in structure, operation and effect are described and the same features as those in the first embodiment will be omitted for brevity.

FIG. 4 is a top plan view of the airbag 2 taken on line III—III of FIG. 5, which is seen from the attachment side of the inflator 9. FIG. 5 is a sectional view of the airbag 2 in an inflated state.

In the second embodiment, a reinforcement cloth 20 is applied to a circumference of the vent hole 4. In such a case, adopting the thinnest cloth possible as the reinforcement cloth 20 has the effect of reducing the weight of the airbag 2 and reducing the volume of the folded state. The cover cloth 6 is sewed on the airbag 2 in a way that it partially blocks the vent hole 4 where the reinforcement cloth 20 has been applied. Due to the cover cloth 6, the vent hole 4 which discharges the inflation gas is set in an appropriate size to adjust the internal pressure of the airbag 2 and thus absorbs the shock when the vehicular occupant collides with the airbag 2.

By applying the reinforcement cloth 20 to the area around the vent hole 4, it is possible to further reduce the possibility that the airbag 2 breaks at the vent hole 4 when the airbag 2 inflates.

Figure 6:
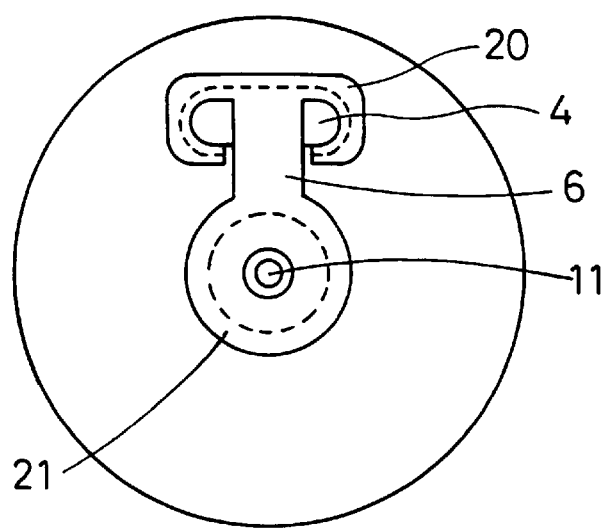
FIG. 6 is a top plan view of an airbag of the third embodiment according to the present invention, seen from the installation side of inflator.

With reference to FIG. 6, the third embodiment according to the present invention will be explained. As shown in FIG. 6, a first reinforcement cloth 20 for the vent hole 4 and a second reinforcement cloth 21 for the hole section 11 are applied to each circumference. The first reinforcement cloth 20 and the second reinforcement cloth 21 are connected by the cover cloth 6. That is, the cover cloth 6, the first reinforcement cloth 20 and the second reinforcement cloth 21 are made of a piece of cloth. The first and second reinforcement cloths 20 and 21 achieve reinforcement of the area around the vent hole 4 and the hole section 11.

With such a structure, it is possible to further reduce the possibility that the airbag 2 breaks at the hole section 11 and the vent hole 4 when the airbag 2 is inflated. In addition, because the cover cloth 6, the first reinforcement cloth 20 and the second reinforcement cloth 21 are made of a piece of cloth, it is not needed to sew each clothes 6, 20, 21 separately on the airbag 2, thus reducing the manufacturing cost of the airbag device 1.

Figure 7:
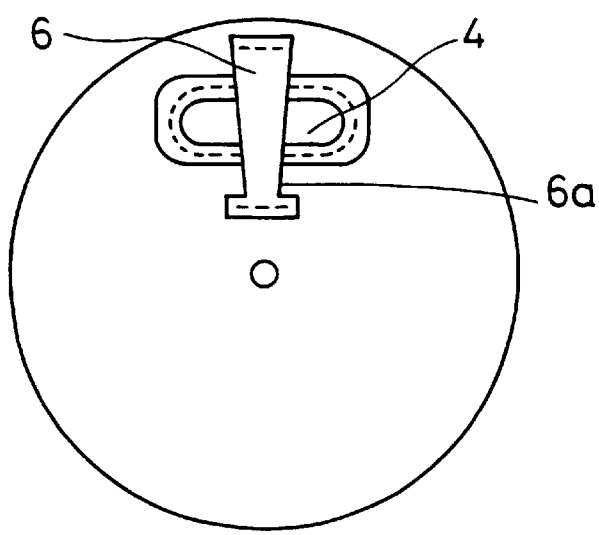
FIG. 7 is a top plan view of an airbag of the fourth embodiment according to the present invention, seen from the installation side of inflator.

With reference to FIG. 7, the fourth embodiment according to the present invention will be explained. As shown in FIG. 7, one section of the cover cloth 6 is made narrower. As a result, if the vehicle occupant collides with the airbag 2 which has inflated upon a vehicle collision, and the internal pressure of the airbag 2 rises abnormally high, narrower section 6a is broken by the internal pressure of the airbag 2. Thus, the internal pressure decreases immediately since the inflation gas is discharged through the wide area of the vent hole 4.

In this way, the fourth embodiment includes pressure adjusting mechanism to adjust the internal pressure of the airbag 2, and it is possible to prevent the airbag 2 from breaking by the high pressure and achieve protection of the vehicular occupant.

Figure 8:
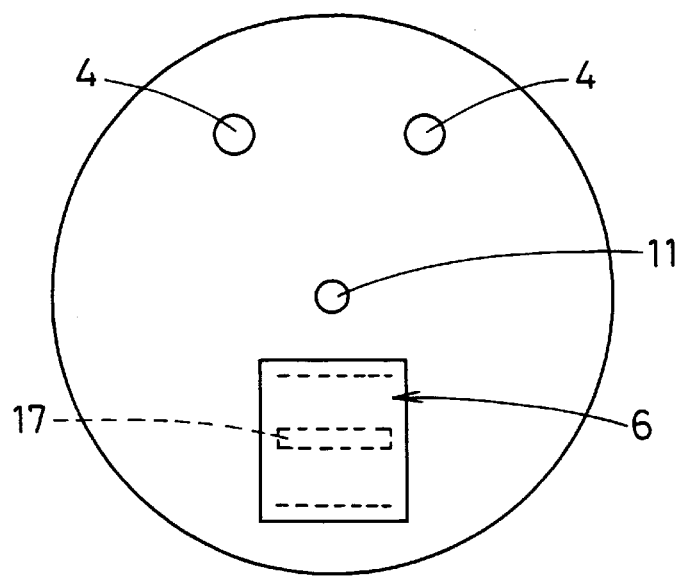
FIG. 8 is a top plan view of an airbag of the fifth embodiment according to the present invention, seen from the installation side of inflator.

With reference to FIG. 8, the fifth embodiment according to the present invention will be explained. As shown in FIG. 8, (a) vent holes 4 of an appropriate size at two locations, and (b) a slit 17 which functions as the primary hole are located separately. It is of course possible to adopt a structure with one vent hole 4 or with three vent holes 4. The cover cloth 6 is sewed on the airbag 2 so that it covers the slit 17 formed on the airbag 2 for insertion of the inflator 9.

When the cover cloth 6 is lifted up away from the inner surface of the airbag 2, the inflator 9 is inserted into the airbag 2 from the slit 17. If the airbag 2 inflates in case of the vehicle collision, the internal pressure of the airbag 2 is adjusted by the vent holes 4. In such a case, the slit 17 is blocked by the cover cloth 6 which is pressed down to the inner surface of the airbag 2. Therefore, the inflation gas inside the airbag 2 is not discharged to the outside through the slit 17 and thus it is possible to avoid any abnormal reduction in the internal pressure of the airbag 2.

As mentioned above, even if the inflator 9 is inserted into airbag 2 from a position other than the vent hole 4, it is possible to obtain exactly the same effect as in the first embodiment.

Figure 9A:
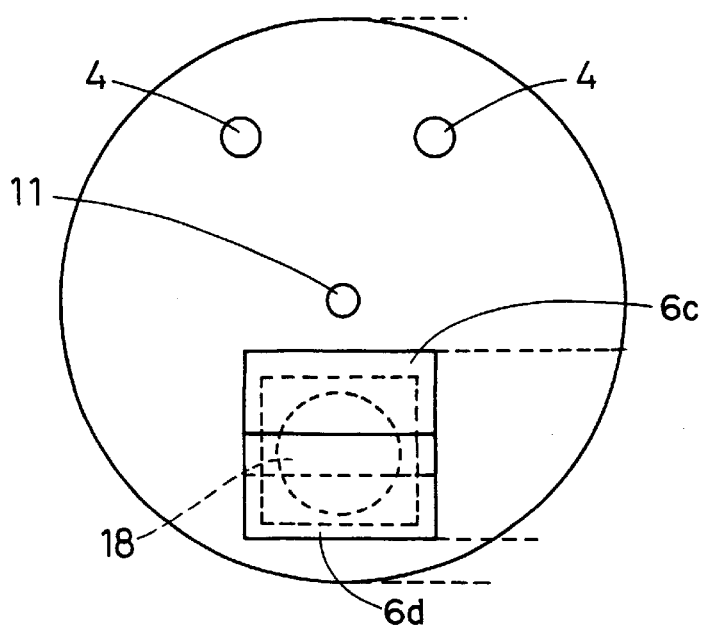
FIG. 9A is a top plan view of an airbag of the sixth embodiment according to the present invention, seen from the installation side of inflator.
Figure 9B:
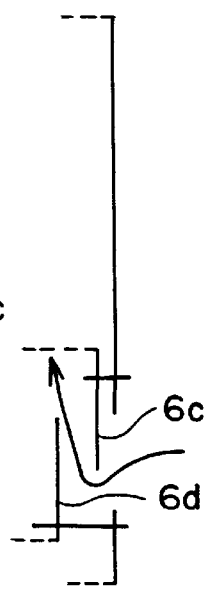
FIG. 9B is a explanation view illustrating a structure of cover cloths 6c and 6d.

With reference to FIG. 9, the sixth embodiment according to the present invention will be explained. As shown in FIG. 9, (a) two vent holes 4 of the appropriate size, and (b) an insertion hole 18 which functions as the primary hole are located separately. It is of course possible to adopt a structure with one vent hole 4 or with three vent holes 4. The insertion hole 18 which can insert the inflator 9 into the airbag 2 is blocked by the cover cloths 6c and 6d sewed to the airbag 2. In more detail, as shown in FIG. 9, two cloths used as the cover cloth are overlapped so that the inflator 9 can be inserted from the location where they overlap. With such a structure, if the airbag 2 is inflated, the cover cloth 6c is pressed by the cover cloth 6d so that the inflation gas inside the airbag 2 is not discharged to the outside therefrom. Thus it is possible to avoid any abnormal reduction in the internal pressure of the airbag 2. In addition, it is possible with such a structure to obtain exactly the same effect as in the first embodiment.

Figure 10A:
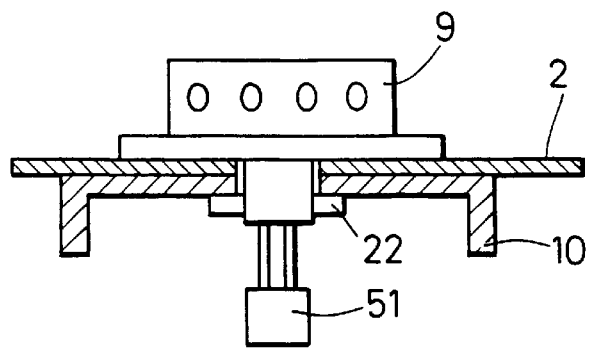
FIG. 10A is a sectional view of an airbag device of the seventh embodiment according to the present invention.
Figure 10B:
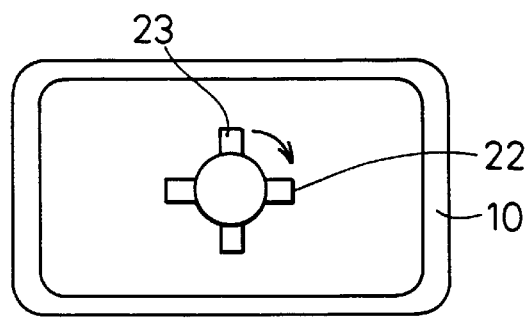
FIG. 10B is a rear view of an airbag of the seventh embodiment according to the present invention.

With reference to FIGS. 10A and 10B; the seventh embodiment according to the present invention will be explained. As is shown in FIG. 10A and 10B, when fixing the airbag 2 and the inflator 9 to the base plate 10, instead of using the screw section 16, a protrusion 22 can be used. That is the fixing is easily achieved with the protrusion 22 and a protrusion passage 23. The protrusion passage 23 penetrates the base plate 10 to allow passage of the protrusion 22.

In the seventh embodiment constructed in this way, the protrusion 22 and the connector 51 are drawn out inside the base plate 10 through the protrusion passage 23. After that, the protrusion 22 is rotated so that its direction differs from that of the protrusion passage 23. In this way, the protrusion 22 catches on sections of the base plate 10 other than the protrusion passage 23 so that the inflator 9 is secured to the base plate 10.

The airbag 2 which holds the inflator 9 thereinto described in detail in the above embodiments makes it possible to eliminate the necessity for strongly tightening the airbag 2 between the base plate 10 and the inflator 9 by means of the screw section 16 and the nut 12. Therefore, it is possible to make use of the simple fixing mechanism described above and manufacture the airbag device 1 easily.

Figure 11:
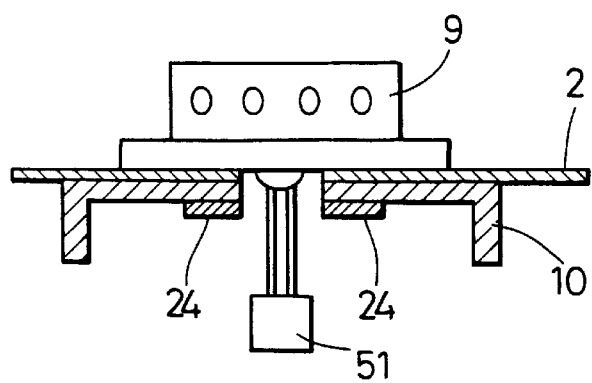
FIG. 11 is a sectional view of an airbag device of the eighth embodiment according to the present invention.
Figure 12:
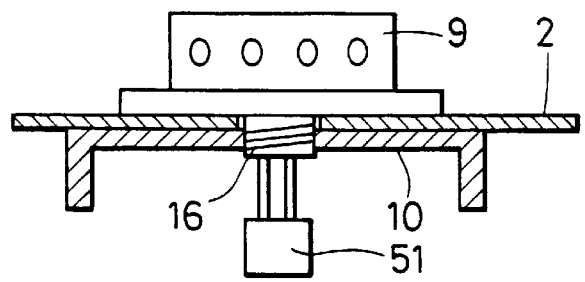
FIG. 12 is a sectional view of an airbag device of the ninth embodiment according to the present invention.
Figure 13:
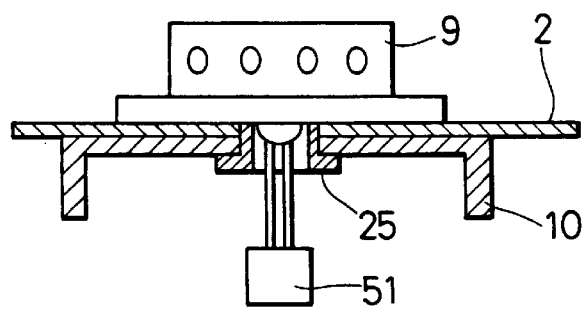
FIG. 13 is a sectional view of an airbag device of the tenth embodiment according to the present invention.
Figure 14:
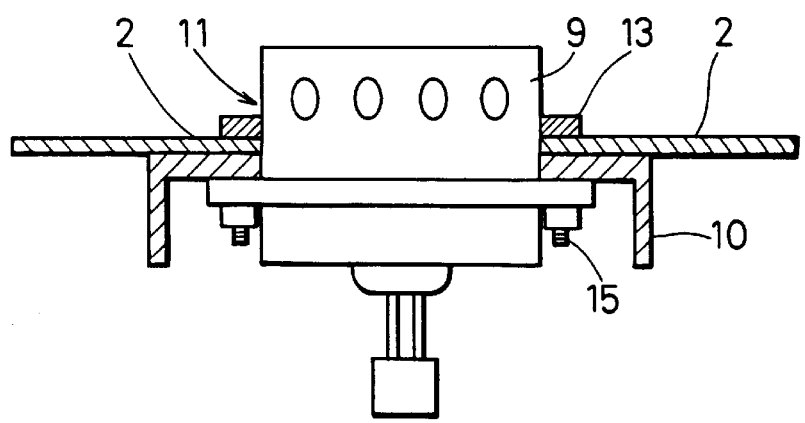
FIG. 14 is a sectional view of the airbag device according to the prior art.

FIGS. 11 to 13 show examples of how to simply attach the inflator 9 to the base plate 10.

FIG. 11 shows an example in which the inflator 9 is made of steel and secured to the base plate 10 by means of a permanent magnet 24.

FIG. 12 shows an example in which the inflator 9 is secured by simply screwing the screw section 16 thereof directly to the base plate 10.

FIG. 13 shows an example in which the inflator 9 is secured to the base plate 10 by screwing a flange screw 25 into the inflator 9.

The present invention is not limited to the embodiments described above but can be changed in various ways as described below.

For example, in the embodiments, it was explained about the case where the present invention was applied to an airbag device for the driver's seat and the air bag device was attached to the steering unit 50. However, it is also possible to apply the present invention to an airbag device located any position inside the vehicle, such as an airbag device for a seat next to the driver's seat.

Also, in order to fix the airbag 2, it is possible to fasten the airbag 2 with bolts or the like in the vicinity of the retaining section 7. In such a case, even if the stress during inflation of the airbag 2 concentrates on the retaining section 7 retained by bolts so that the airbag 2 is damaged, because the area of the retaining section 7 sandwiched between the inflator 9 and the base plate 10 is large, the airbag 2 will not be detached from the base plate 10.

Furthermore, in the fifth embodiment, the slit 17 is covered by the cover cloth 6. However, instead of the cover cloth 6, it is also possible to close up the slit 17 with, for instance, an adhesive, after inserting the inflator 9 into the airbag 2.

Also, although the hole section 11 was made circular, the hole section 11 can be formed oval in shape, corresponding to the shape of, for instance, the connector 51. In this case, it is possible to maintain the attachment strength of the airbag 2.

What is claimed is:

1. An airbag device for a vehicle comprising:

a base plate;

an inflator mounted on said base plate and having a base face;

securing means provided at a center of said base face of said inflator for securing said inflator to said base plate; and an airbag, said inflator being disposed within said airbag, said airbag having a hole therein, said securing means passing through said hole, a diameter of said hole being smaller than a diameter of said inflator, said airbag also having a retention section surrounding said hole of said airbag, which is sandwiched and fastened between said base face of said inflator and said base plate when said inflator is secured to said base plate by said securing means.

2. An airbag device for a vehicle as claimed in claim 1, further comprising connecting means for electrically connecting said inflator, wherein said securing means has a hollow portion inside, and said connecting means connects to said inflator through said hollow portion.

3. An airbag device for a vehicle as claimed in claim 1, wherein said securing means comprises:

a cylinder portion projected from said inflator and comprising threads on a periphery thereof; and a nut screwed onto said threads of said cylinder portion.

4. An airbag device for a vehicle comprising:

a base plate;

an inflator mounted on said base plate;

securing means for securing said inflator to said base plate;

an airbag, said inflator being disposed within said airbag, said airbag having a hole therein, said securing means passing through said hole, a diameter of said hole being smaller than a diameter of said inflator, said airbag also having a retention section surrounding said hole of said airbag, which is sandwiched and fastened between a base face of said inflator and said base plate when said inflator is secured to said base plate by said securing means; and connecting means for electrically connecting said inflator, wherein said securing means has a hollow portion inside, and said connecting means connects to said inflator through said hollow portion.

5. An airbag device for a vehicle comprising:

a base plate;

an inflator mounted on said base plate;

securing means for securing said inflator to said base plate; and an airbag, said inflator being disposed within said airbag, said airbag having a hole therein, said securing means passing through said hole, a diameter of said hole being smaller than a diameter of said inflator, said airbag also having a retention section surrounding said hole of said airbag, which is sandwiched and fastened between a base face of said inflator and said base plate when said inflator is secured to said base plate by said securing means, said airbag also having a primary hole through which said inflator is inserted into said airbag, said primary hole being both an insertion hole for said inflator and a vent hole for discharging gas supplied by said inflator.

6. An airbag device for a vehicle as claimed in claim 3, further comprising:

a cover attached to said airbag and covering a part of said primary hole to adjust a pressure in said airbag when said inflator generates gas.

7. An airbag device for a vehicle as claimed in claim 6, wherein one section of said cover is made narrower than another section of said cover so that said cover breaks in case of an abnormal rise of pressure in said airbag.

8. An airbag device for a vehicle as claimed in claim 6, further comprising:

a patch sewed on a periphery of at least one of said primary hole and said hole through which said securing means passes to reinforce said airbag, wherein said cover and said patch are formed from a single piece of cloth.

9. An airbag device for a vehicle comprising:

a base plate;

an inflator mounted on said base plate;

securing means for securing said inflator to said base plate;

an airbag, said inflator being disposed within said airbag, said airbag having a hole therein, said securing means passing through said hole, a diameter of said hole being smaller than a diameter of said inflator, said airbag also having a retention section surrounding said hole of said airbag, which is sandwiched and fastened between a base face of said inflator and said base plate when said inflator is secured to said base plate by said securing means, said airbag also having a primary hole through which said inflator is inserted into said airbag; and a cover attached to said airbag and covering all of said primary hole to prevent gas supplied by said inflator from discharging through said primary hole.

10. An airbag device for a vehicle comprising:

a base plate;

an inflator mounted on said base plate;

securing means for securing said inflator to said base plate;

an airbag, said inflator being disposed in said airbag, said airbag having a primary hole through which said inflator is inserted in said airbag, a secondary hole through which said securing means extends, a diameter of said secondary hole being smaller than a diameter of said inflator and a retention section surrounding said secondary hole, which is sandwiched and fastened between a base face of said inflator and said base plate when said inflator is secured to said base plate by said securing means; and a cover attached to said airbag so that said cover partly covers said primary hole to adjust a pressure in said airbag when said inflator generates gas, wherein one section of said cover is made narrower than another section of said cover so that said cover breaks in case of an abnormal rise of said pressure in said airbag.

* * * * *